Patented May 1, 1934

1,956,571

UNITED STATES PATENT OFFICE

1,956,571

PROCESS OF SULPHONATION

Nicolas Benoit Grillet, Neuilly, France, assignor to Société des Usines Chimiques Rhone-Poulenc, Paris, France No Drawing. Application August 15, 1931, Serial No. 557,367

12 Claims. (Cl. 260—159)

This invention relates to a process of sulphonating benzene to produce m-benzene-disulphonic acid, which in turn after conversion into its disodium salt serves as an initial material for the production of resorcinol by the caustic fusion method. It is an object of this invention to increase the efficiency and economy of the ordinary method of producing said disulphonic acid.

In the production of resorcinol it is customary to treat benzene with concentrated sulphuric acid whereby to produce benzene monosulphonic acid. The reaction proceeds along the following equation:

$$C_6H_6 + H_2SO_4 = C_6H_5.SO_3H + H_2O \quad (1)$$

Sulphuric anhydride is then introduced into the mixture in sufficient quantity to convert the monosulphonic acid into a disulphonic acid. It will be obvious, that in view of the presence of water of formation from the monosulphonation step, this must first be converted into sulphuric acid, before there will be available free $SO_3$ to effect the introduction of the second sulphonic acid group. The reactions involved in this step may be expressed by the following equation:

$$C_6H_5.SO_3H + H_2O + 2SO_3 = C_6H_4.(SO_3H)_2 + H_2SO_4 \quad (2)$$

Thus the mol of sulphuric acid monohydrate consumed in the monosulphonation step is regenerated in the disulphonation step, at the expense, of course, of the additional $SO_3$ introduced.

The $SO_3$ may be introduced in the form of gas. But more commonly it is introduced in the form of fuming sulphuric acid (oleum). Thus, for each mol of $SO_3$ consumed, there is introduced into the sulphonation mass an additional quantity of $H_2SO_4$, depending on the strength of the oleum. As a result of this, the quantity of sulphuric acid present in the sulphonation mass at the end of the disulphonation step, is greater than at the very begining (i. e. before monosulphonation), the excess if 60% oleum is used amounting to about 1.09 mols.

In the above we have assumed ideal conditions. Namely in Equation (1) we started with 1 mol of benzene and 1 mol of sulphuric acid. In practice, the sulphonation will not proceed at an efficient rate when the concentration of sulphuric acid in the mixture drops to a very low value. It becomes therefore necessary to add initially such an excess of sulphuric acid that even near the end of the monosulphonation reaction, when about 1 mol of water has been formed in the reaction mass, the concentration of sulphuric acid should still be high enough to push forward the reaction at a commercially practicable rate. The excesses commonly employed in the industry in this reaction are generally 50 to 100%. Assuming that an excess of 100% is employed in the monosulphonation step, and that 60% oleum is used in the disulphonation step, Equations (1) and (2) may now be rewritten as follows:

$$C_6H_6 + 2H_2SO_4 = C_6H_5.SO_3H + H_2SO_4 + H_2O \quad (1')$$

$$C_6H_5.SO_3H + H_2SO_4 + H_2O + (2SO_3 + 1.09H_2SO_4) = C_6H_4.(SO_3H)_2 + 3.09H_2SO_4 \quad (2')$$

In the general practice today it is customary to run the entire sulphonation mass into an aqueous alkaline medium such as milk of lime whereby the entire free acid is neutralized and precipitated in the form of $CaSO_4$, while the benzene-disulphonic acid is converted into the calcium salt which remains in solution in the aqueous mass. The latter, after filtration is then further treated with sodium sulphate, sulphate or carbonate, to convert the disulphonic compound into its disodium salt, precipitating the calcium as calcium sulphate, sulphate or carbonate, respectively.

It is obvious that in the above procedure about 2 to 3 mols of sulphuric acid are wasted for each mol of benzene sulphonated, depending on the amount of excess sulphuric acid used in the monosulphonation step and on the strength of the oleum used in the disulphonation step.

It is accordingly an object of my process to eliminate or reduce to a minimum this unnecessary waste of sulphuric acid.

It is a further object of this invention to reduce to a minimum the quantity of lime required for neutralizing the sulphonation mass, thereby further increasing the economy of the process.

Moreover, where the entire excess of sulphuric acid is neutralized with lime, the quantity of $CaSO_4$ formed is very great, and increases the cost of filtration. It is accordingly a further object of my invention to reduce as much as possible the bulk of this precipitate, thereby further economizing on the cost of filtration.

Other and further objects of this invention will become apparent as the description proceeds.

I accomplish my object by operating the entire process in a cyclic, semi-continuous arrangement, whereby I make use of the sulphuric acid regenerated in the disulphonation step to effect the monosulphonation of a subsequent batch. More particularly, I operate substantially as follows.

I charge into the sulphonation vessel suitable quantities of benzol and sulphuric acid monohydrate and effect the mono-sulphonation in the ordinary manner. I then add oleum (preferably 60% oleum) in just sufficient quantity to dehydrate the monosulphonation mass and to provide the requisite $SO_3$ to form the second sulphonic acid group. Now, instead of running the entire mass into alkali (milk of lime) and neutralizing, I draw off only such a portion thereof as contains an amount of sulphuric acid equal to the excess introduced by the oleum during the disulphonation step. In other words, I leave in the reaction vessel such a quantity of the reaction mass as will contain just about the optimum amount the sulphuric acid which is required for efficient monosulphonation of the next quantity of benzene to be introduced (say about 2 mols of sulphuric acid per mol of benzene). I now charge into the sulphonator the corresponding quantity of benzene (i. e. about 1 mol), and repeat the entire operation as before.

Assuming that the quantity of benzene charged into the sulphonator each time equals 1 mol, it is obvious that the quantity withdrawn for neutralization the first time is less than 1 mol. More specifically, the fraction of sulphonated benzene withdrawn corresponds to the ratio which the excess sulphuric acid introduced by the oleum bears to the total quantity of sulphuric acid present in the mass before withdrawal. The quantity of sulphonated benzene in the sulphonator therefore accumulates and the fraction thereof withdrawn each time increases in weight, until a stage is reached at which the fraction constantly withdrawn contains just about 1 mol of sulphonated benzene, and is therefore equal to the molar quantity of benzene introduced at each cycle. The conditions thereafter remain constant, and at each cycle 1 mol of benzene is disulphonated with a net waste of sulphuric acid equal to that quantity which is introduced with the 2 mols of $SO_3$ required for each disulphonation (about 1.09 mols, where 60% oleum is used). It is obvious therefore, that by my novel process I effect a saving of sulphuric acid per mol of benzene sulphonated equal to the difference between about 3 mols of sulphuric acid and that quantity of sulphuric acid contained in oleum carrying 2 mols of $SO_3$. From the latter fact it is again obvious that the saving is greater the higher the concentration of the oleum used. For best results, I prefer to use oleum of a strength of 60% or higher. The fraction constantly withdrawn in this case is about ⅓, and the saving effected amounts to about 2 mols of sulphuric acid per mol of benzene sulphonated.

It is not absolutely necessary to approach the constant cycle in the precise manner above indicated, namely, by withdrawing each time a fraction which will contain just the quantity of sulphuric acid introduced by the oleum. Larger or smaller fractions may be withdrawn, and corresponding adjustments may be made in the next cycle by introducing larger quantities of benzene or by adding sulphuric acid to make up any deficiency. The system will eventually again approach a constant cycle. Thus instead of leaving always just 2 mols of sulphuric acid in the sulphonator and adding thereto 1 mol of benzene, more than 2 mols of sulphuric acid may be left in the sulphonator in the early cycles, and a correspondingly greater quantity of benzene may be introduced with the result that the concentration of benzene-disulphonic acid is built up faster, and the constant cycle is approached sooner. Nor is it absolutely necessary to add always the same quantity of benzene even after the cycle has approached constancy. Occasional variations may be introduced, with the result that the regularity of the cycles is temporarily disturbed, but as the new variations are repeated cycle after cycle, a new constant cycle is gradually approached.

If desired, the constant cycle may be arbitrarily built up from the very beginning, for instance by charging into the sulphonator at the very start 2 mols of benzene disulphonic acid, 1 mol of benzene, and 2.18 mols of sulphuric acid monohydrate. Upon completion of the monosulphonation, 2 mols of $SO_3$ are introduced in the form of 60% oleum, carrying with them about 1.09 mols of sulphuric acid. When the disulphonation is complete, ⅓ of the entire mass or entire volume is withdrawn for neutralization, and 1 mol of fresh benzene is introduced into the sulphonator. It is obvious that after this step the sulphonator contains just about the same reactants in the same total and relative quantities as at the beginning of the first cycle. Namely, it contains 2 mols of benzene-disulphonic acid, 1 mol of benzene, and about 2.18 mols of sulphuric acid monohydrate. The cycle thus repeats itself without substantial variations.

The following specific example will serve further to illustrate my invention.

Example

*Monosulphonation.*—Into a mixture of 213.6 parts of sulphuric acid monohydrate ($1.09 \times 2$ mols) and 476 parts of benzene-disulphonic acid (2 mols), contained in a jacketed sulphonator equipped with reflux condenser, stirrer, and thermometer, there are added gradually, over a period of about 4 to 5 hours, 78 parts (1 mol) of benzene, keeping the temperature of the mass at about 70° C. The temperature is now raised to about 120° C. within a period of about ½ hour, and maintained at this point for about 1 hour.

*Disulphonation.*—The above mass is now cooled to about 70° C., and 266.6 parts of 60% oleum (containing 2 mols of $SO_3$ and 1.09 mols of sulfuric acid) are run in over a period of about 4 hours. Toward the ends of this period the temperature of the mass is allowed to rise to about 100° C. and is then further raised to about 120° C. within a period of about ½ hour. After maintaining this temperature for a period of about 3 hours, upon which time the disulphonation is substantially complete, ⅓ of the entire liquid volume is removed for liming. The residue is now cooled to about 70° C., and the entire cycle is repeated as described above.

It will be noted that the fraction withdrawn (⅓) contains 1 mol of benzene-disulphonic acid and 1.09 mols of sulphuric acid (100%), while the residue in the sulphonator contains 2 mols of benzene-disulphonic acid and 2.18 mols of sulphuric acid, which is precisely the constitution of the mixture with which the cycle was started.

Many variations may be introduced into the practice of my invention without departing from the spirit of the same.

If desired, my novel improvement may be applied to a process wherein $SO_3$ gas is used in the sulphonation step instead of oleum. In this case, the fraction of the sulfonation mass withdrawn at each cycle is quite arbitrary, and the content of sulphuric acid in the sulphonation mass must each time be replenished by adding a fresh quantity of a sulphuric acid equal to the quantity withdrawn. The saving in sulphuric acid will increase the smaller the fraction. On the other hand, the amount of labor involved in handling the materials will increase and the time-output of a given set of apparatus will decrease, the smaller the fraction. The preferred fraction to be withdrawn is therefore a compromise between the two opposing sets of advantages and disadvantages.

Assuming that a 100% excess of sulphuric acid is used in the first step, the equations for the sulphonation in this case may be rewritten as follows:

$$C_6H_6 + 2H_2SO_4 = C_6H_5.SO_3H + H_2SO_4 + H_2O \quad (1'')$$

$$C_6H_5.SO_3H + H_2SO_4 + H_2O + 2SO_3 = C_6H_5.(SO_3H)_2 + 2H_2SO_4 \quad (2'')$$

If the old practice be now followed of treating the entire mass with alkaline liquid, the waste of sulphuric acid per mol of benzene sulphonated is 2 mols. If my improved process, however, is followed and assuming that the fraction withdrawn each time is ⅓ of the sulphonation mass, then upon the establishment of equilibrium ⅔ mols of sulphuric acid and 1 mol of benzene-disulphonic acid are withdrawn and neutralized in each cycle. The saving of sulphuric acid per mol of benzene sulphonated is therefore 2−⅔=1⅓ mols.

Various modifications intermediate the two extreme examples herein described may be practiced without departing from the spirit of this invention.

In the claims below it should be understood that by the term "sulphuric anhydride" I mean to designate and cover SO₃ either in gaseous form or in the form of oleum. Also, by the term "m-benzene-disulphonic acid" I am referring to the product obtainable by reacting upon benzene successively with sulphuric acid and sulphuric anhydride to produce benzene-disulphonic acid. This product is not, strictly speaking, a single compound. According to some authorities, it contains also p-benzene-disulphonic acid and probably some of the o-isomer. Since, however, the m-isomer is the predominant constituent, the mixture is generally referred to in the art as "m-benzene-disulphonic acid."

I claim:

1. The process of preparing m-benzene disulphonic acid, which comprises treating benzene with an excess of concentrated sulphuric acid over the equimolecular ratio, introducing into the resulting mass a quantity of sulphuric anhydride sufficient to dehydrate the mono-sulphonation mass and convert the mono-sulphonated product into a disulphonic acid, withdrawing a fraction of the disulphonation mass, and utilizing the residual sulphuric acid in the disulphonation mass to effect mono-sulphonation of a further quantity of benzene.

2. In the process of preparing m-benzene disulphonic acid by treating benzene first with concentrated sulphuric acid to effect mono-sulphonation and then with sulphuric anhydride to effect further sulphonation, the improvement which comprises utilizing the residual sulphuric acid of the disulphonation step for mono-sulphonating a further quantity of benzene.

3. In the process of preparing m-benzene disulphonic acid, the step which comprises introducing benzene into a sulphonation mixture comprising benzene disulphonic acid and concentrated sulphuric acid.

4. A cyclic process for producing m-benzene disulphonic acid which comprises treating benzene with an excess of concentrated sulphuric acid to effect mono-sulphonation, adding to the mono-sulphonation mass a quantity of sulphuric anhydride sufficient to convert the benzene-monosulphonic acid formed into benzene-disulphonic acid, withdrawing a portion of the disulphonation mass, introducing into the residual mass a further quantity of benzene, and repeating the cycle.

5. A process as in claim 4, in which the sulphuric anhydride is introduced in the form of oleum.

6. A process as in claim 4, in which the sulphuric anhydride is introduced in the form of oleum, and the portion of the sulphonation mass withdrawn is of such magnitude as to contain just about the excess of sulphuric acid introduced by the oleum.

7. A process as in claim 4, in which the sulphuric anhydride is introduced in the form of gaseous sulphur trioxide.

8. A process as in claim 4, wherein the sulphuric anhydride is introduced in the form of gaseous sulphur trioxide, and wherein the quantity of sulphuric acid withdrawn from the reaction mass is replenished before the introduction of a further quantity of benzene.

9. A process which comprises treating 1 mol of benzene with about 1.5 to 2 mols of sulphuric acid monohydrate to produce substantially 1 mol of benzene-monosulphonic acid, adding 60% oleum in quantity equivalent to about 2 mols of sulphur trioxide to convert the benzene-monosulphonic acid into benzene-disulphonic acid, withdrawing about one third of the entire sulphonation mass, introducing into the residual mass a further mol of benzene and repeating the cycle.

10. The process of producing m-benzene-disulphonic acid, which comprises reacting upon benzene in succession with sulphuric acid and oleum, in the presence of an initial quantity of benzenedisulphonic acid.

11. The process of producing m-benzene-disulphonic acid, which comprises reacting upon benzene in succession with sulphuric acid and oleum, in the presence of an initial quantity of benzenedisulphonic acid, withdrawing a portion of the final reaction mass whereby to leave behind substantially the initial quantity of benzene-disulphonic acid, mixing the residual mass with a fresh quantity of benzene, and repeating the cycle.

12. In the process of preparing m-benzene-disulphonic acid by treating benzene with concentrated sulphuric acid to effect monosulphonation and then with sulphuric anhydride to effect further sulphonation, the improvement which comprises withdrawing a fraction of the sulphonation mass for the recovery of its benzene-disulphonic acid content, and utilizing the residual mass for monosulphonating a further quantity of benzene.

NICOLAS BENOIT GRILLET.

CERTIFICATE OF CORRECTION.

Patent No. 1,956,571.  May 1, 1934.

NICOLAS BENOIT GRILLET.

It is hereby certified that error appears in the printed specification of the above numbered patent requiring correction as follows: Page 1, lines 77 and 80, for "sulphate" second occurrence, read sulphite; page 2, line 15, for "the" read of; line 122, for "ends" read end; and line 149, strike out the article "a"; and that the said Letters Patent should be read with these corrections therein that the same may conform to the record of the case in the Patent Office.

Signed and sealed this 19th day of June, A. D. 1934.

Bryan M. Battey (Seal)  Acting Commissioner of Patents,